US011336790B2

(12) United States Patent
Oura

(10) Patent No.: US 11,336,790 B2
(45) Date of Patent: May 17, 2022

(54) IMAGE READING DEVICE, ELECTRONIC DEVICE, AND CONTROL METHOD

(71) Applicant: PFU Limited, Ishikawa (JP)

(72) Inventor: Kyohei Oura, Ishikawa (JP)

(73) Assignee: PFU LIMITED, Ishikawa (JP)

(*) Notice: Subject to any disclaimer, the term of this patent is extended or adjusted under 35 U.S.C. 154(b) by 0 days.

(21) Appl. No.: 17/314,363

(22) Filed: May 7, 2021

(65) Prior Publication Data

US 2021/0400163 A1    Dec. 23, 2021

(30) Foreign Application Priority Data

Jun. 18, 2020   (JP) .............................. JP2020-105288

(51) Int. Cl.
| | |
|---|---|
| *G06F 15/00* | (2006.01) |
| *G06F 3/12* | (2006.01) |
| *G06K 1/00* | (2006.01) |
| *H04N 1/00* | (2006.01) |
| *H04N 1/028* | (2006.01) |

(52) U.S. Cl.
CPC ....... *H04N 1/00896* (2013.01); *H04N 1/0282* (2013.01)

(58) Field of Classification Search
CPC .......................... H04N 1/00896; H04N 1/0282
USPC ................. 358/1.13, 1.15, 1.14, 1.1
See application file for complete search history.

(56) References Cited

U.S. PATENT DOCUMENTS

| | | | | |
|---|---|---|---|---|
| 5,699,161 A | * | 12/1997 | Woodworth | G01B 11/00 356/628 |
| 2015/0249767 A1 | * | 9/2015 | Utsumi | H04N 1/00551 358/1.14 |
| 2017/0318170 A1 | | 11/2017 | Utsumi | |
| 2020/0044471 A1 | * | 2/2020 | Shimizu | H02J 7/0063 |

FOREIGN PATENT DOCUMENTS

| | | |
|---|---|---|
| JP | 2003-229983 A | 8/2003 |
| JP | 2015-165620 A | 9/2015 |

* cited by examiner

*Primary Examiner* — Douglas Q Tran
(74) *Attorney, Agent, or Firm* — McDermott Will & Emery LLP

(57) ABSTRACT

A scanner includes: a pulse generator that generates a pulse signal; a transmissive optical sensor including a photo transmitter that projects pulsed light in response to the pulse signal and a photo receiver facing the photo transmitter; a charge-discharge unit capable of storing an electric charge of the pulse signal and discharging the stored electric charge; and a controller that causes the charge-discharge unit to discharge the electric charge when the photo receiver receives the pulsed light, causes the charge-discharge unit to store the electric charge when the photo receiver does not receive the pulsed light, and that starts supply of power to a CPU when an amount of the electric charge is at or above a threshold.

4 Claims, 7 Drawing Sheets

IMAGE READING DEVICE, ELECTRONIC DEVICE, AND CONTROL METHOD

CROSS-REFERENCE TO RELATED APPLICATION

The present application claims priority to and incorporates by reference the entire contents of Japanese Patent Application No. 2020-105288, filed on Jun. 18, 2020.

FIELD

The present disclosure relates to an image reading device, an electronic device, and a control method.

BACKGROUND

In some scanners, media targeted for reading by the scanners (hereinafter referred to as "reading target media") are inserted from openings of the scanners into conveying paths in the scanners. Some of such scanners, into which the reading target media are inserted, include optical sensors to determine whether the reading target media have been inserted into the conveying paths. In a scanner including, for example, a transmissive optical sensor for determination, light incident from a photo transmitter is blocked by a reading target medium. Thus, a central processing unit (CPU) detecting a decrease in quantity of the received light determines that the reading target medium has been inserted into a conveying path. The CPU then starts rotation of a conveying roller.

Examples of related-art are described in Japanese Patent Application Laid-open No. 2003-229983 and in Japanese Patent Application Laid-open No. 2015-165620.

If no power is supplied to the CPU, the CPU cannot operate. Thus, the CPU cannot determine whether the reading target medium has been inserted into the conveying path before the start of supply of power to the CPU. Meanwhile, the power consumption of a scanner increases if the supply of power to the CPU has been started before the insertion of the reading target medium into the conveying path in order for the CPU to determine whether the reading target medium has been inserted.

SUMMARY

According to an aspect of an embodiment, an image reading device includes a conveying path, a medium targeted for reading being conveyed in the conveying path, a CPU, a generator configured to generate a pulse signal, a sensor comprising a photo transmitter and a photo receiver, the photo transmitter configured to project pulsed light toward the conveying path in response to the pulse signal, the photo receiver facing the photo transmitter with the conveying path therebetween, a charge-discharge unit capable of storing an electric charge of the pulse signal and discharging the stored electric charge, and a controller configured to cause the charge-discharge unit to discharge the electric charge when the photo receiver receives the pulsed light, cause the charge-discharge unit to store the electric charge when the medium blocks the pulsed light and the photo receiver does not receive the pulsed light, and configured to start supply of power to the CPU when an amount of the electric charge stored in the charge-discharge unit is at or above a threshold.

The object and advantages of the disclosure will be realized and attained by means of the elements and combinations particularly pointed out in the claims.

It is to be understood that both the foregoing general description and the following detailed description are exemplary and explanatory and are not restrictive of the disclosure, as claimed.

DESCRIPTION OF EMBODIMENTS

Figure 1:
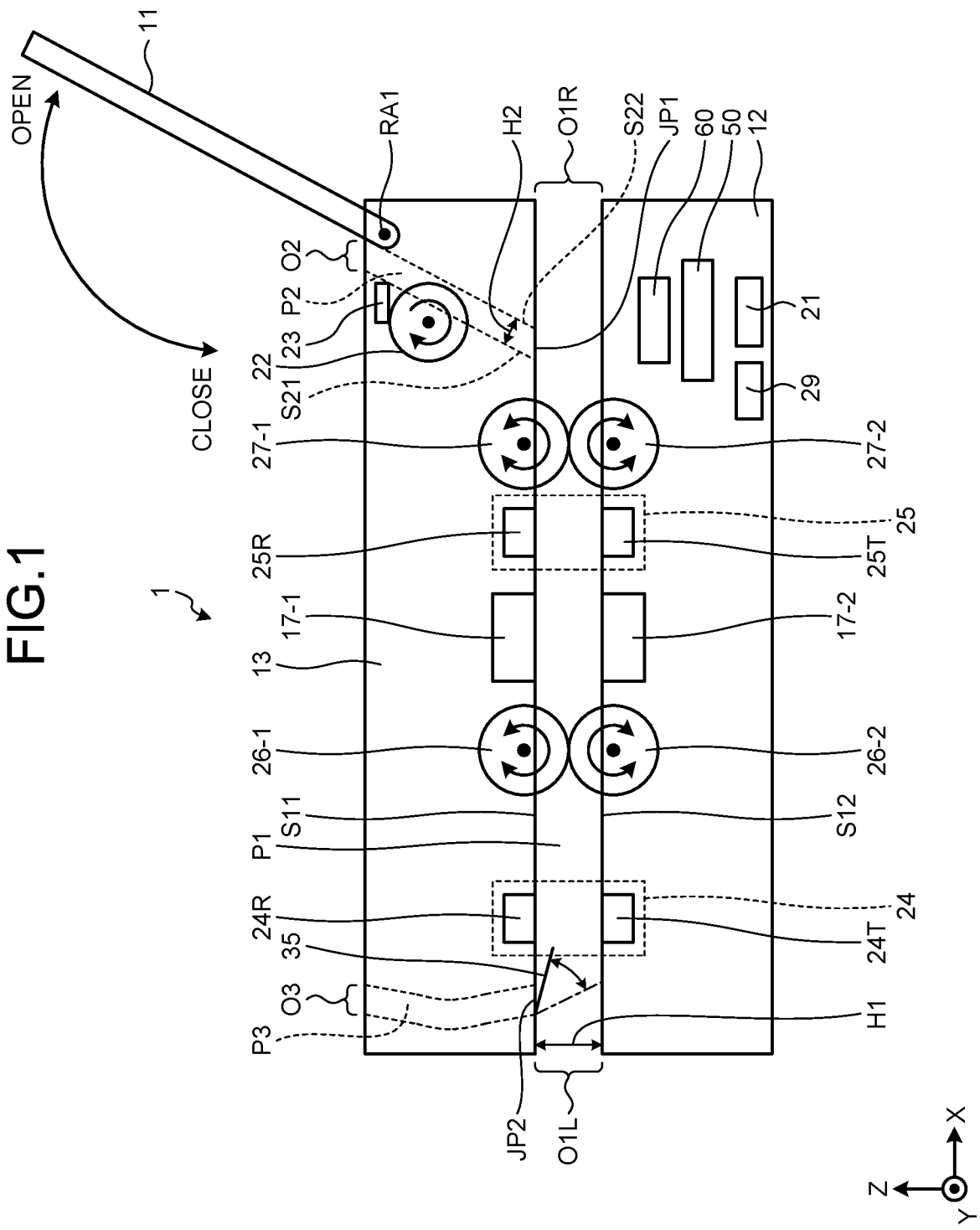
FIG. 1 is a view of an exemplary configuration of a scanner according to a first embodiment of the present disclosure.

Preferred embodiments of the present disclosure will be explained with reference to accompanying drawings. In the following embodiments, the same configuration and the step performing the same process are denoted by the same reference numerals and/or characters.

An exemplary image reading device or scanner will now be described. It should be noted, however, that the technique according to the present disclosure is also applicable to any image reading device other than a scanner. For example, the technique according to the present disclosure is applicable to a different type of image reading device, such as copier. An image reading device is an example of electronic devices. The technique according to the present disclosure is applicable to any electronic device other than an image reading device.

First Embodiment

Configuration of Scanner

Figure 2:
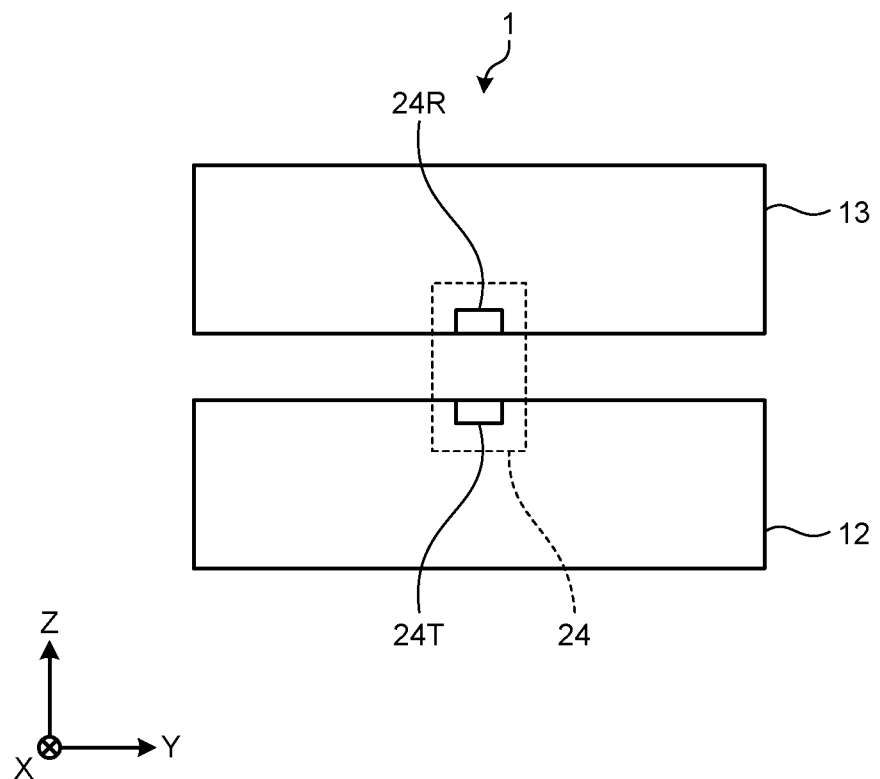
FIG. 2 is another view of the exemplary configuration of the scanner according to the first embodiment of the disclosure.

FIGS. 1 and 2 are views of an exemplary configuration of a scanner according to a first embodiment of the present disclosure. FIG. 1 is a side view and FIG. 2 is a front view. Examples of a reading target medium inserted into a scanner 1 illustrated in FIGS. 1 and 2 include texts with letters and figures.

In FIG. 1, the scanner 1 includes a feed tray 11, a lower housing 12, and an upper housing 13. The feed tray 11 is mounted to the upper housing 13 via a pivot point RA1 and openable around the pivot point RA1. FIG. 1 illustrates the open feed tray 11 whereas FIG. 2 illustrates the closed feed tray 11.

The scanner 1 also includes medium readers 17-1 and 17-2, a CPU 21, a signal processor 50, a power supply unit 60, a memory 29, a pick roller 22, transmissive optical sensors 24 and 25, conveying rollers 26-1, 26-2, 27-1, and 27-2, conveying paths P1, P2, and P3, and a flap 35. A support of the flap 35 is formed on the upper housing 13. The support of the flap 35 is disposed at a fixed end of the flap 35. A free end of the flap 35 in a state of being lifted to the upper housing 13 indicates the initial position of the flap 35. The pick roller 22, the conveying rollers 26-1, 26-2, 27-1, and 27-2, and the flap 35 are driven by a motor (not illustrated).

The medium readers 17-1 and 17-2 are hardware achieved by image sensors, for example, contact image sensors (CIS). Examples of the memory include random access memories (RAM), such as synchronous dynamic random access memories (SDRAM), read only memories (ROM), and flash memories.

The conveying path P1 has an opening O1L made in the left side face of the scanner 1, an opening O1R made in the right side face of the scanner 1, a top face S11, and a bottom face S12. The top face S11 of the conveying path P1 corresponds to the bottom face of the upper housing 13 and the bottom face S12 of the conveying path P1 corresponds to the top face of the lower housing 12. In other words, the conveying path P1 is defined between the upper housing 13 and the lower housing 12. The conveying path P1 is used for conveying a reading target medium inserted from the opening O1L (hereinafter referred to as "first reading target medium"). An operator usually inserts the first reading target medium into the opening O1L by hand.

The conveying path P2 has an opening O2 made in the top face of the upper housing 13, a top face S21, and a bottom face S22. The conveying path P2 is used for conveying a reading target medium (hereinafter referred to as "second reading target medium") inserted from the opening O2. The second reading target medium placed onto the feed tray 11 is inserted into the opening O2.

The conveying path P2 joins the conveying path P1 at a cross-point JP1 with the conveying path P1. A width H1 of height of each of the openings O1L and O1R of the conveying path P1 (in other words, a distance between the top face S11 and the bottom face S12) is larger than a width H2 of height of the opening O2 of the conveying path P2 (in other words, a distance between the top face S21 and the bottom face S22). Usually, a thick reading target medium is inserted into the opening O1L and a thin reading target medium is inserted into the opening O2 because the width H1 is larger than the width H2. In other words, the first reading target medium usually has a larger thickness than the second reading target medium.

The conveying path P3 has an opening O3 made in the top face of the upper housing 13 and joins the conveying path P1 at a cross-point JP2 with the conveying path P1.

The transmissive optical sensor 24 includes a photo transmitter 24T and a photo receiver 24R. The photo transmitter 24T and the photo receiver 24R face each other with the conveying path P1 therebetween. Light projected from the photo transmitter 24T toward the top face S11 is received by the photo receiver 24R. The photo transmitter 24T is disposed in the bottom face S12 and the photo receiver 24R is disposed in the top face S11. While the scanner 1 is in an "operation mode", the light projected from the photo transmitter 24T is kept constant at a first projected light quantity QH under control by the CPU 21. While the scanner 1 is in a "sleep mode" consuming lower power than the operation mode, the quantity of the light projected from the photo transmitter 24T shifts between the first projected light quantity QH and a second projected light quantity QL lower than the first projected light quantity QH every predetermined time T1 in response to a pulse signal output from the signal processor 50. The sleep mode may be referred to as the "standby mode".

The transmissive optical sensor 25 includes a photo transmitter 25T and a photo receiver 25R. The photo transmitter 25T and the photo receiver 25R face each other with the conveying path P1 therebetween. Light projected from the photo transmitter 25T toward the top face S11 is received by the photo receiver 25R. The photo transmitter 25T is disposed in the bottom face S12 and the photo receiver 25R is disposed in the top face S11. While the scanner 1 is in the operation mode, the light projected from the photo transmitter 25T is kept constant at the first projected light quantity QH under control by the CPU 21. While the scanner 1 is in the sleep mode, the photo transmitter 25T is turned off.

The scanner 1 has no "power button" for starting supply of power to the CPU 21. The supply of power from the power supply unit 60 to the CPU 21 starts after the operator of the scanner 1 opens the closed feed tray 11 or after the first reading target medium is inserted into the conveying path P1 from the opening O1L and the signal processor 50 determines that the first reading target medium is present in the conveying path P1. The CPU 21 supplied with power from the power supply unit 60 can operate. When the scanner 1 is in the sleep mode, no power supplies to the CPU 21. when the scanner 1 is in the operation mode, power supplies to the CPU 21.

Conveyance of Second Reading Target Medium

Figure 3:
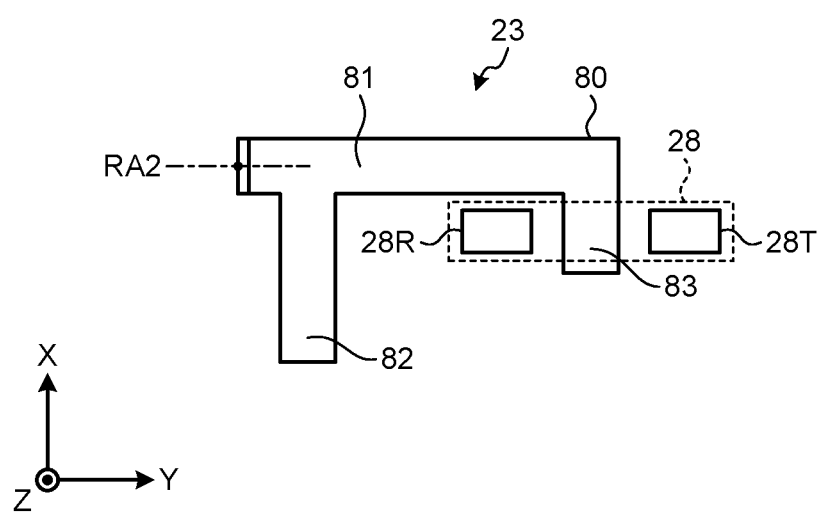
FIG. 3 is a view of an exemplary configuration of an empty sensor according to the first embodiment of the disclosure.
Figure 4:
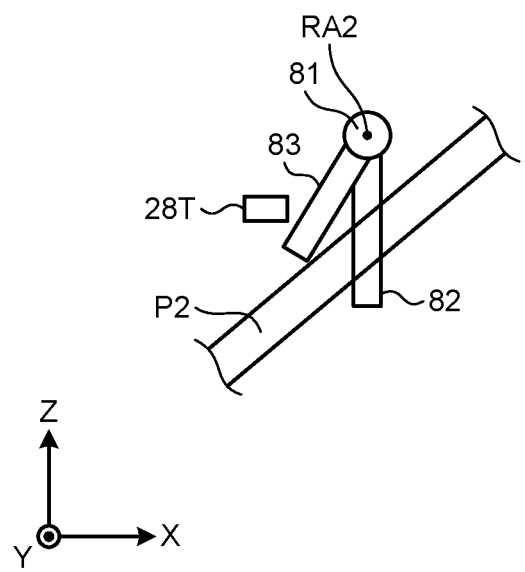
FIG. 4 is a view of an exemplary operation of the empty sensor according to the first embodiment of the disclosure.
Figure 5:
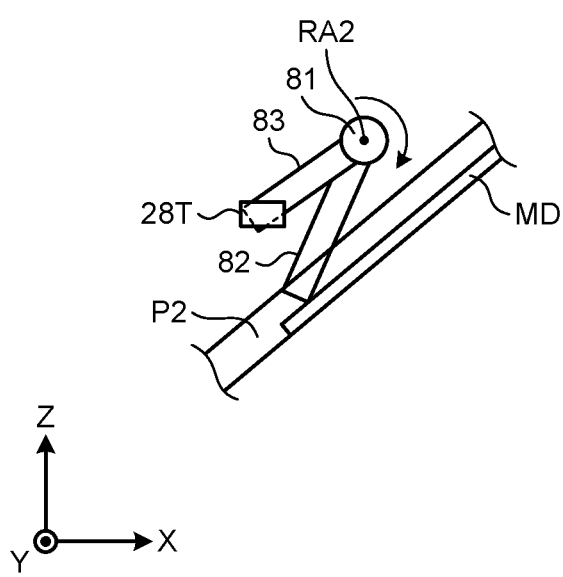
FIG. 5 is another view of the exemplary operation of the empty sensor according to the first embodiment of the disclosure.

FIG. 3 is a view of an exemplary configuration of an empty sensor according to the first embodiment of the present disclosure. FIGS. 4 and 5 are views of an exemplary operation of the empty sensor according to the first embodiment of the disclosure.

In FIG. 3, an empty sensor 23 includes a transmissive optical sensor 28 and a movable member 80. The transmissive optical sensor 28 includes a photo transmitter 28T and a photo receiver 28R. The photo transmitter 28T and the photo receiver 28R face each other. Light projected from the photo transmitter 28T is received by the photo receiver 28R. The light projected from the photo transmitter 28T is kept constant at the first projected light quantity QH under control by the CPU 21. The movable member 80 has an arm 81 and includes levers 82 and 83 that are coupled to the arm 81. The movable member 80 is rotatable around a pivot point RA2.

In the case that the second reading target medium is not placed on the feed tray 11, the second reading target medium is absent in the conveying path P2, as illustrated in FIG. 4. Thus, the light projected from the photo transmitter 28T is received by the photo receiver 28R without being blocked by the lever 83.

After the operator of the scanner 1 opens the closed feed tray 11, the signal processor 50 switches the scanner 1 from the sleep mode to the operation mode to start supply of power from the power supply unit 60 to the CPU 21.

The CPU 21 and a controller 53, which will be described below, determine, in response to a quantity of the light received by the photo receiver 24R (hereinafter referred to as "first received light quantity") being at or above a threshold THR, that a level of the first received light quantity (hereinafter referred to as "first received light level") is at a high level H. The CPU 21 and the controller 53 determine, in response to the first received light quantity being below the threshold THR, that the first received light level is at a low level L lower than the high level H. The threshold THR is prestored in the memory 29.

The CPU 21 determines, in response to a quantity of the light received by the photo receiver 25R (hereinafter referred to as "second received light quantity") being at or above the threshold THR, that a level of the second received light quantity (hereinafter referred to as "second received light level") is at the high level H. The CPU 21 determines, in response to the second received light quantity being below the threshold THR, that the second received light level is at the low level L.

The CPU 21 determines, in response to a quantity of the light received by the photo receiver 28R (hereinafter referred to as "third received light quantity") being at or above a threshold TH1, that a level of the third received light quantity (hereinafter referred to as "third received light level") is at the high level H. The CPU 21 determines, in response to the third received light quantity being below the threshold TH1, that the third received light level is at the low level L.

As illustrated in FIG. 5, second reading target media MD are placed onto the open feed tray 11 and inserted from the opening O2 into the conveying path P2. Thus, the lever 82 is upwardly pushed. The lever 82, which has been upwardly pushed by the second reading target media MD, rotates the movable member 80 clockwise. In conjunction, the lever 83 moves from the position in FIG. 4 to the position in FIG. 5. Thus, the light projected from the photo transmitter 28T is blocked by the lever 83 and the third received light level decreases from the high level H to the low level L. After the third received light level decreases from the high level H to the low level L, the CPU 21 starts rotation of the pick roller 22 and the conveying rollers 26-1, 26-2, 27-1, and 27-2 and drops the free end of the flap 35 to the lower housing 12. The CPU 21 rotates the pick roller 22 and the conveying rollers 26-1 and 27-1 clockwise while rotating the conveying rollers 26-2 and 27-2 counterclockwise. The free end of the flap 35, which has been dropped to the lower housing 12, couples the conveying path P3 and the conveying path P1. The conveying path P2, the conveying path P1, and the conveying path P3 form a continuous conveying path.

A second reading target medium is conveyed in the conveying path P2 by the pick roller 22 and passes the joining point JP1. Upon the leading end of the second reading target medium reaching the interface between the conveying roller 27-1 and the conveying roller 27-2, the second reading target medium is conveyed by the conveying rollers 27-1 and 27-2 in the conveying path P1 in the negative X-direction (to the left in the figure). Upon the leading end of the second reading target medium, which is conveyed by the conveying rollers 27-1 and 27-2 in the conveying path P1 in the negative X-direction, reaching the transmissive optical sensor 25, the light projected from the photo transmitter 25T is blocked by the second reading target medium. Thus, the second received light level decreases from the high level H to the low level L. After the second received light level decreases from the high level H to the low level L, the CPU 21 starts reading of the second reading target medium by the medium readers 17-1 and 17-2. During conveyance of the second reading target medium in the conveying path P1 in the negative X-direction, the second reading target medium is read by the medium readers 17-1 and 17-2. The medium reader 17-1 reads the upper side of the second reading target medium whereas the medium reader 17-2 reads the lower side of the second reading target medium.

Upon the leading end of the second reading target medium reaching the interface between the conveying roller 26-1 and the conveying roller 26-2 during conveyance of the second reading target medium in the conveying path P1 in the negative X-direction, the second reading target medium is further conveyed by the conveying rollers 26-1 and 26-2 in the conveying path P1 in the negative X-direction. The leading end of the second reading target medium, which is conveyed by the conveying rollers 26-1 and 26-2 in the conveying path P1 in the negative X-direction, comes into contact with the upper face of the flap 35 while proceeding to the joining point JP2 to enter the conveying path P3 during conveyance of the second reading target medium. Thus, the second reading target medium after being read is conveyed in the conveying path P3 in the positive Z-direction (upward in the figure) and discharged from the opening O3 onto the top face of the upper housing 13.

After the trailing end of the last one of the second reading target media placed on the feed tray 11 passes the empty sensor 23, the third received light level increases from the low level L to the high level H. After the third received light level decreased from the high level H to the low level L and a predetermined time has been elapsed from another increase in the third received light level from the low level L to the high level H, the CPU 21 stops rotation of the pick roller 22 and the conveying rollers 26-1, 26-2, 27-1, and 27-2.

Conveyance of First Reading Target Medium

In the sleep mode, a first reading target medium is inserted from the opening O1L into the conveying path P1 in the positive X-direction (to the right in the figure) with the free end of the flap 35 in a state being lifted to the upper housing 13. Since the light projected from the photo transmitter 24T is blocked by the first reading target medium, the first received light level decreases from the high level H to the low level L. The signal processor 50 determines, in response to the first received light level, that the first reading target medium is present in the conveying path P1, which will be described below. Upon determining that the first reading target medium is present in the conveying path P1, the signal processor 50 switches the scanner 1 from the sleep mode to the operation mode to start supply of power from the power supply unit 60 to the CPU 21. The CPU 21, to which the supply of power has started, starts counterclockwise rotation of the conveying rollers 26-1 and 27-1 while starting clockwise rotation of the conveying rollers 26-2 and 27-2. The first reading target medium is further inserted in the positive X direction. Upon the leading end of the first reading target medium reaching the interface between the conveying roller 26-1 and the conveying roller 26-2, the first reading target medium is conveyed by the conveying rollers 26-1 and 26-2 in the conveying path P1 in the positive X-direction.

Upon the leading end of the first reading target medium, which is conveyed by the conveying rollers 26-1 and 26-2 in the positive X-direction, reaching the transmissive optical sensor 25, the light projected from the photo transmitter 25T is blocked by the first reading target medium. Thus, the second received light level decreases from the high level H to the low level L. After the second received light level decreases from the high level H to the low level L, the CPU 21 stops rotation of the conveying rollers 26-1, 26-2, 27-1, and 27-2.

Once the rotation of the conveying rollers 26-1, 26-2, 27-1, and 27-2 is stopped, the operator presses "scanning start button" (not shown) of the scanner 1. The CPU 21 then restarts counterclockwise rotation of the conveying rollers 26-1 and 27-1 while restarting clockwise rotation of the conveying rollers 26-2 and 27-2. The first reading target medium is further conveyed by the conveying rollers 26-1 and 26-2 in the conveying path P1 in the positive X-direction. Upon the leading end of the first reading target medium reaching the interface between the conveying roller 27-1 and the conveying roller 27-2, the first reading target medium is further conveyed by the conveying rollers 27-1 and 27-2 in the conveying path P1 in the positive X-direction.

Upon the trailing end of the first reading target medium passing the transmissive optical sensor 25, the light projected from the photo transmitter 25T is received by the photo receiver 25R. Thus, the second received light level increases from the low level L to the high level H. During conveyance of the first reading target medium in the conveying path P1 in the positive X-direction, the second received light level decreases from the high level H to the low level L. Upon another increase in the second received light level from the low level L to the high level H, the CPU 21 reverses rotation of the conveying rollers 26-1, 26-2, 27-1, and 27-2 to rotate the conveying rollers 26-1 and 27-1 clockwise while rotating the conveying rollers 26-2 and 27-2 counterclockwise. The direction of the first reading target medium conveyed in the conveying path P1 is thereby reversed from the positive X-direction to the negative X-direction. After the direction of the conveyed first reading target medium is reversed from the positive X-direction to the negative X-direction, the trailing end of the first reading target medium reaches the transmissive optical sensor 25 and thus the light projected from the photo transmitter 25T is blocked by the first reading target medium. Hence, the second received light level decreases from the high level H to the low level L.

After reversing the direction of the conveyed first reading target medium from the positive X-direction to the negative X-direction, the CPU 21 starts reading of the first reading target medium by the medium readers 17-1 and 17-2. While being conveyed in the conveying path P1 in the negative X-direction, the first reading target medium is read by the medium readers 17-1 and 17-2. The medium reader 17-1 reads the upper side of the first reading target medium whereas the medium reader 17-2 reads the lower side of the first reading target medium. The first reading target medium after being read is discharged from the opening O1L.

After the leading end of the first reading target medium passes the transmissive optical sensor 25 during conveyance of the first reading target medium in the negative X-direction, the light projected from the photo transmitter 25T is received by the photo receiver 25R. Thus, the second received light level increases from the low level L to the high level H. During conveyance of the first reading target medium in the conveying path P1 in the negative X-direction, the second received light level decreases from the high level H to the low level L. After a predetermined time has been elapsed from another increase in the second received light level from the low level L to the high level H, the CPU 21 stops rotation of the conveying rollers 26-1, 26-2, 27-1, and 27-2.

Configuration of Signal Processor

Figure 6:
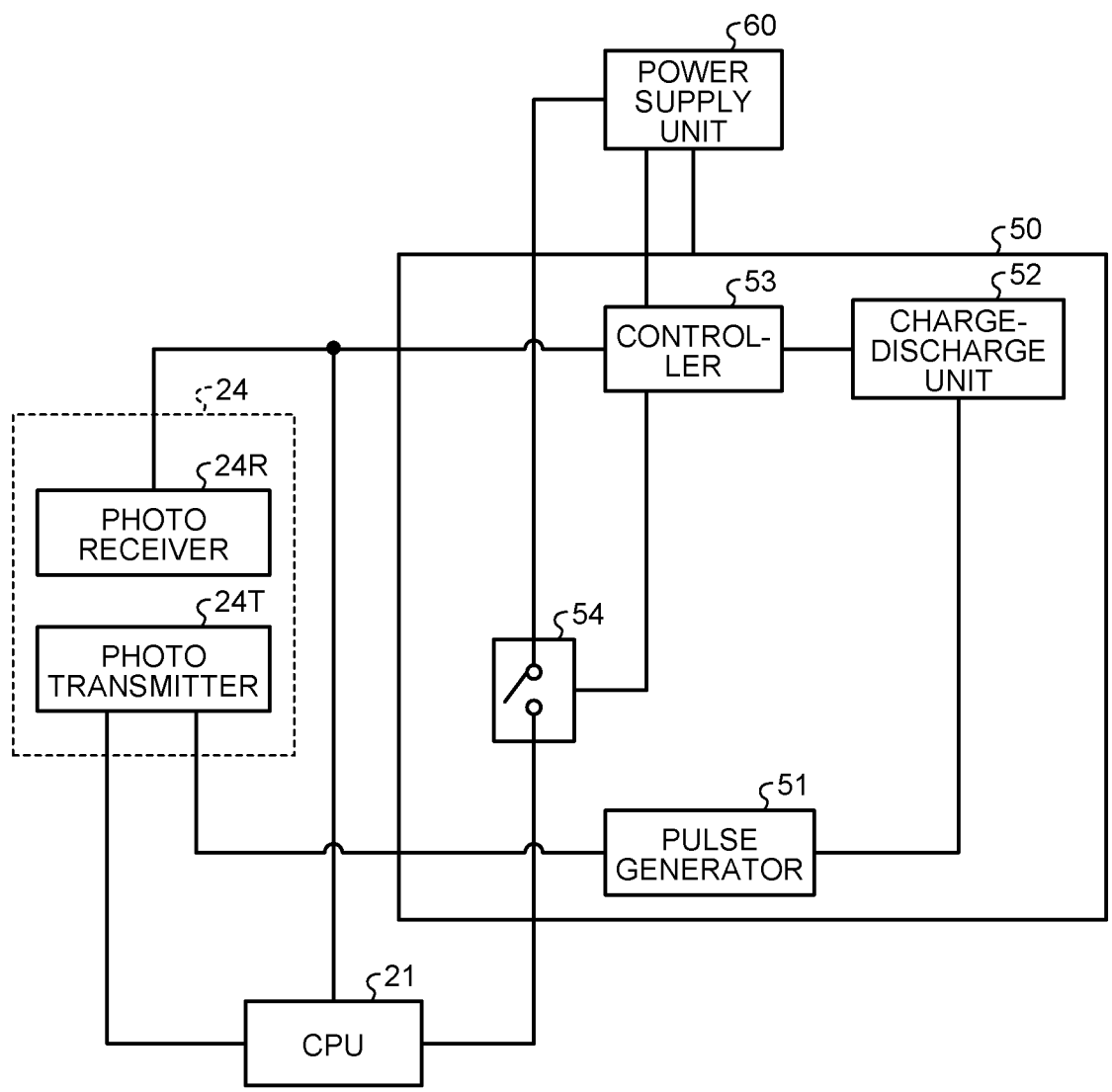
FIG. 6 is a view of an exemplary configuration of a signal processor according to the first embodiment of the disclosure.

FIG. 6 is a view of an exemplary configuration of the signal processor according to the first embodiment of the present disclosure. In FIG. 6, the signal processor 50 includes a pulse generator 51, a charge-discharge unit 52, a controller 53, and a switch 54. The charge-discharge unit 52 includes a capacitor (not shown) that can store an electric charge and discharge the stored electric charge. Examples of the controller 53 include processors, such as digital signal processors (DSP) and field programmable gate arrays (FPGA).

While the scanner 1 is in the sleep mode, the power supply unit 60 supplies power to the signal processor 50. While the scanner 1 is in the operation mode, the power supply unit 60 supplies power to the CPU 21 through the switch 54. The scanner 1 in the sleep mode consumes a power of, for example, about 0.3 W. In contrast, the scanner 1 in the operation mode consumes a power of, for example, about 9W.

Steps of Process in Scanner

Figure 7:
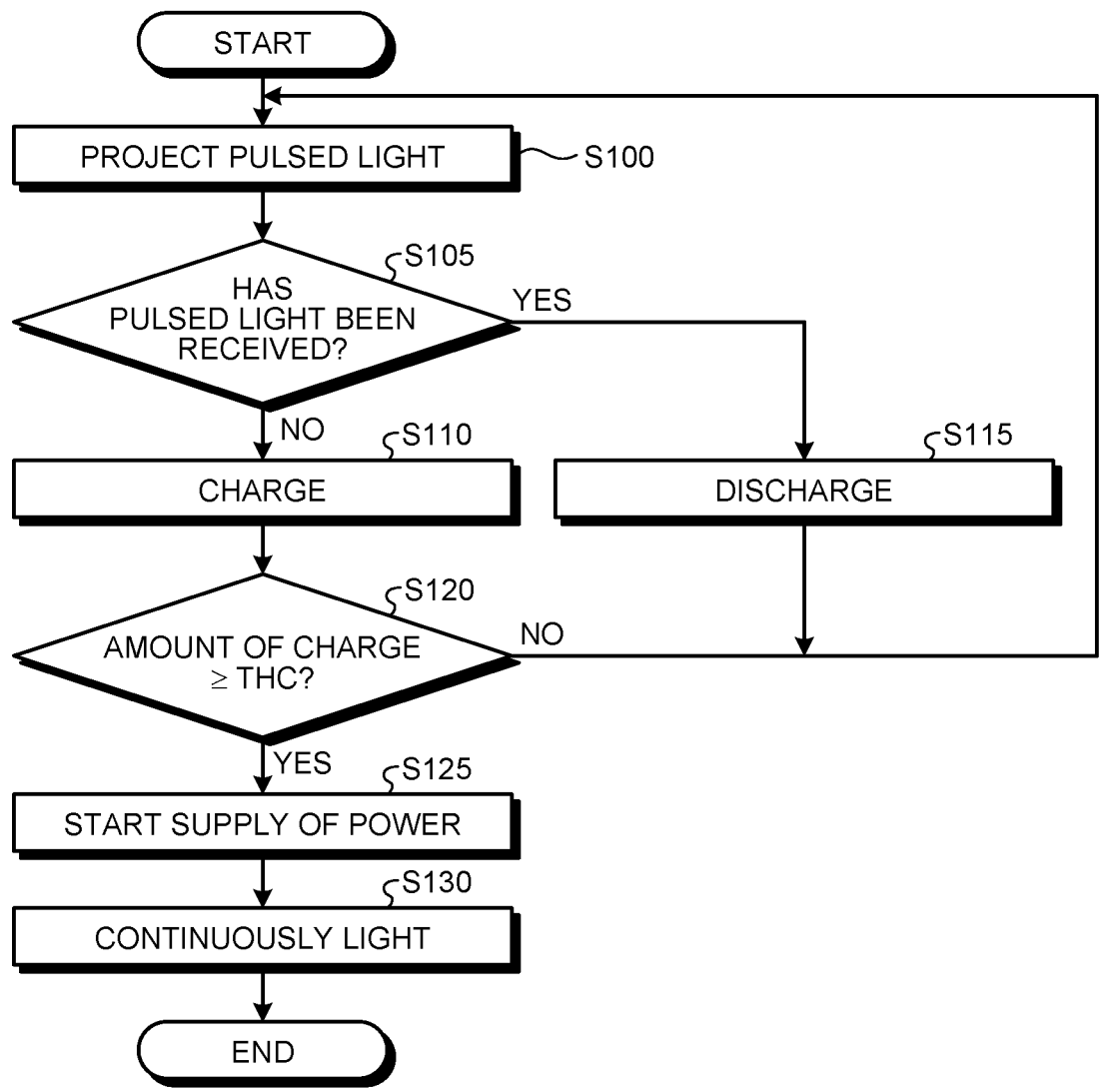
FIG. 7 is a flowchart of exemplary steps of a process in the scanner according to the first embodiment of the disclosure.

FIG. 7 is a flowchart of exemplary steps of a process in the scanner according to the first embodiment of the present disclosure. The flowchart illustrated in FIG. 7 starts while the scanner 1 is in the sleep mode. At the start of the flowchart in FIG. 7, the switch 54 is off and thus the CPU 21 is supplied with no power from the power supply unit 60.

At Step S100, the pulse generator 51 generates a pulse signal and outputs the generated pulse signal to the photo transmitter 24T and the charge-discharge unit 52. The photo transmitter 24T is lighted in a pulsed manner in response to the received pulse signal. For example, the pulse generator 51 generates a pulse signal of square waves at a duty cycle of 50%. The photo transmitter 24T projects light (hereinafter referred to as "pulsed light") toward the conveying path P1, where the quantity of the projected light shifts between the first projected light quantity QH and the second projected light quantity QL every predetermined time T1 in response to the pulse signal.

At Step S105, the controller 53 determines whether the photo receiver 24R has received the pulsed light. For example, the controller 53 determines that the photo receiver 24R receives the pulsed light if the first received light level reaches the high level H during the time T1. The controller 53 determines that the photo receiver 24R does not receive the pulsed light if the first received light level is continuously at the low level L during the time T1. If the photo receiver 24R does not receive the pulsed light (No at Step S105), the process proceeds to Step S110. If the photo receiver 24R receives the pulsed light (Yes at Step S105), the process proceeds to Step S115.

At Step S110, the controller 53 charges the charge-discharge unit 52. In detail, the controller 53 controls the charge-discharge unit 52 at Step S110 such that the electric charge of the pulse signal output from the pulse generator 51 to the charge-discharge unit 52 is stored in the capacitor. After Step S110, the process proceeds to Step S120.

At Step S115, the controller 53 discharges the charge-discharge unit 52. In detail, the controller 53 controls the charge-discharge unit 52 at Step S115 such that the electric charge stored in the capacitor is discharged from the capacitor. After Step S115, the process returns to Step S100.

At Step S120, the controller 53 determines whether the amount of charge of the charge-discharge unit 52, in other words, the amount of the electric charge stored in the capacitor of the charge-discharge unit 52 is at or above a threshold THC. If the amount of charge is at or above the threshold THC (Yes at Step S120), the controller 53 determines that the first reading target medium is present in the conveying path P1. The process then proceeds to Step S125. If the amount of charge is below the threshold THC (No at Step S120), the controller 53 determines that the first reading target medium is absent in the conveying path P1. The process then returns to Step S100.

At Step S125, the controller 53 turns on the switch 54 that is off and starts supply of power from the power supply unit 60 to the CPU 21. At Step S125, the controller 53 stops generation of the pulse signal at the pulse generator 51.

At Step S130, the CPU 21, to which the supply of power has started at Step S125, keeps the quantity of the light projected from the photo transmitter 24T at the first projected light quantity QH to continuously light the photo transmitter 24T. After Step S130, the process ends.

Operation of Scanner

Figure 8:
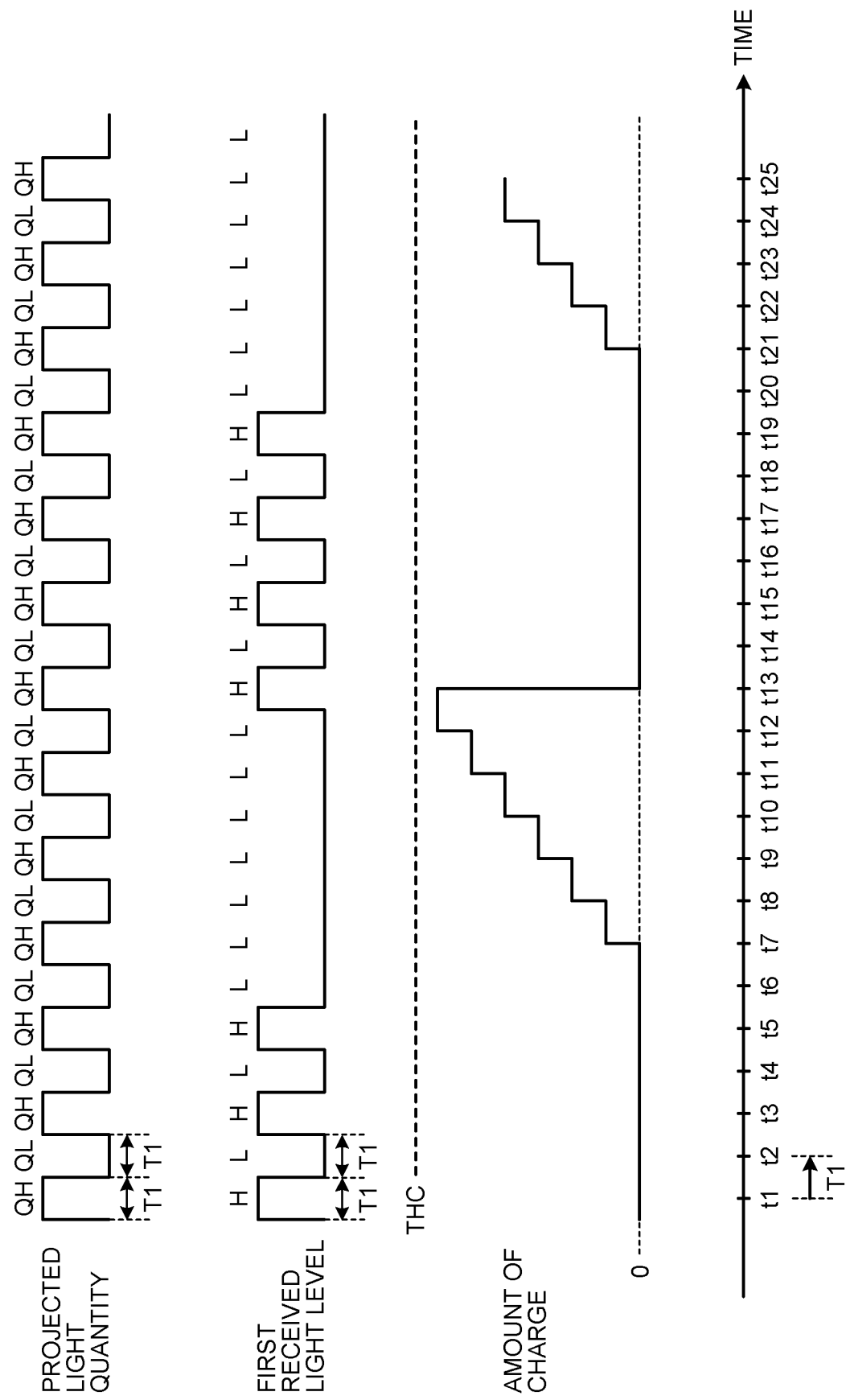
FIG. 8 is a chart explaining an exemplary operation of the scanner according to the first embodiment of the disclosure.
Figure 9:
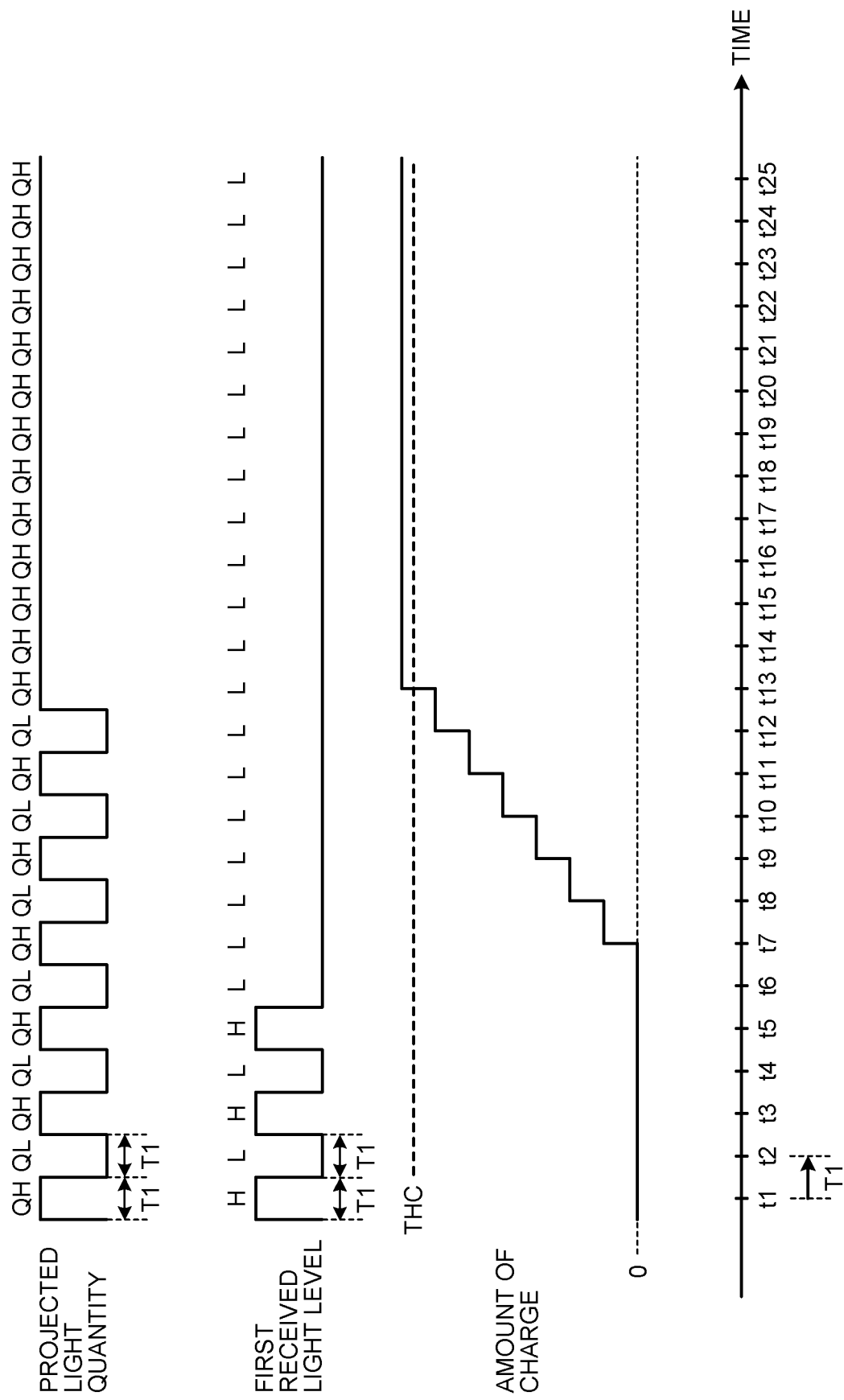
FIG. 9 is another chart explaining the exemplary operation of the scanner according to the first embodiment of the disclosure.

FIGS. 8 and 9 are charts explaining an exemplary operation of the scanner according to the first embodiment of the present disclosure. FIG. 8 illustrates a case of the pulsed light received by the photo receiver 24R before the amount of charge of the charge-discharge unit 52 reaches the threshold THC (hereinafter referred to as "Case C1"). FIG. 9 illustrates a case of the amount of charge of the charge-discharge unit 52 being at or above the threshold THC (hereinafter referred to as "Case C2"). The exemplary operation of the scanner 1 will now be explained with respect to Cases C1 and C2. In each of Cases C1 and C2, the determinations at Steps S105 and S120 in FIG. 7 are carried out at time points t1 to t25 that are each equally distanced by a time T1.

Case C1 (FIG. 8)

In FIG. 8, the first received light level reaches the high level H during some of the times T1 distancing the adjacent time points t1 to t6. Thus, the controller 53 determines that the photo receiver 24R receives the pulsed light (Yes at Step S105) and discharges the charge-discharge unit 52 (Step S115).

The first received light level is never at the high level H during the time T1 between the time points t6 and t7 and is continuously at the low level L during the time T1. Thus, the controller 53 determines, at the time point t7, that the photo receiver 24R does not receive the pulsed light (No at Step S105) and charges the charge-discharge unit 52 (Step S110). In the same manner, the controller 53 determines, at each of the time points t8 to t12, that the photo receiver 24R does not receive the pulsed light (No at Step S105) and charges the charge-discharge unit 52 (Step S110). Since the amount of charge of the charge-discharge unit 52 is below the threshold THC at each of the time points t7 to t12 (No at Step S120), the process returns from Step S120 to Step S100.

The first received light level reaches the high level H during the time T1 between the time points t12 and t13. Thus, the controller 53 determines, at the time point t13, that the photo receiver 24R receives the pulsed light (Yes at Step S105) and discharges the charge-discharge unit 52 (Step S115).

The operation of the scanner at the time points t14 to t20 is the same as that at the time points t1 to t6. The operation of the scanner at the time points t21 to t25 is the same as that at the time points t7 to t12.

Case C2 (FIG. 9)

In FIG. 9, the first received light level reaches the high level H during some of the times T1 distancing the adjacent time points t1 to t6. Thus, the controller 53 determines that the photo receiver 24R receives the pulsed light (Yes at Step S105) and discharges the charge-discharge unit 52 (Step S115).

The first received light level is never at the high level H during the time T1 between the time points t6 and t7 and is continuously at the low level L. Thus, the controller 53 determines, at the time point t7, that the photo receiver 24R does not receive the pulsed light (No at Step S105) and charges the charge-discharge unit 52 (Step S110). In the same manner, the controller 53 determines, at each of time points t8 to t13, that the photo receiver 24R does not receive the pulsed light (No at Step S105) and charges the charge-discharge unit 52 (Step S110). As a result, the amount of charge of the charge-discharge unit 52 is at or above the threshold THC at the time point t13 (Yes at Step S120). Thus, the controller 53 determines, at the time point t13, that the first reading target medium is present in the conveying path P1, starts supply of power from the power supply unit 60 to the CPU 21, and stops generation of the pulse signal at the pulse generator 51 (Step S125). The CPU 21, to which the supply of power has started at the time point t13, keeps the light projected from the photo transmitter 24T at the first projected light quantity QH after the time point t13 to continuously light the photo transmitter 24T.

The first embodiment has been described above.

Second Embodiment

The whole or part of the above-described process in the CPU 21 may be achieved through execution of a computer program, corresponding to the process, by the CPU 21. For example, the computer program corresponding to the process may be stored in the memory 29 and read from the memory 29 by the CPU 21 for execution. Alternatively, the computer program may be stored in a computer program server connected to the scanner 1 via an appropriate network and downloaded from the computer program server into the scanner 1 for execution. Alternatively, the computer program may be stored in a recording medium readable by the scanner 1 and read from the recording medium for execution. Examples of the recording medium readable by the scanner 1 include portable storage media, such as memory cards, USB memories, SD cards, flexible discs, magneto optical discs, CD-ROMs, DVDs, and Blu-ray (registered trademark) discs. Computer programs constitute data processing methods described in appropriate languages or by appropriate describing methods regardless of formats, such as source codes or binary codes. The computer programs are not limited to singly configured ones and may be distributed into a plurality of modules or libraries or may perform their functions in conjunction with another computer program typified by an operating system (OS).

The second embodiment has been described above.

As described above, the image reading device according to the present disclosure (the scanner 1 according to the first embodiment) includes a conveying path (the conveying path P1 according to the first embodiment); a CPU (the CPU 21 according to the first embodiment); a generator (the pulse generator 51 according to the first embodiment); a sensor (the transmissive optical sensor 24 according to the first embodiment); a charge-discharge unit (the charge-discharge unit 52 according to the first embodiment); and a controller (the controller 53 according to the first embodiment). In the conveying path, a medium targeted for reading is conveyed. The generator generates a pulse signal. The sensor includes a photo transmitter (the photo transmitter 24T according to the first embodiment) projecting pulsed light toward the conveying path in response to the pulse signal; and a photo receiver (the photo receiver 24R according to the first embodiment) facing the photo transmitter with the conveying path therebetween. The charge-discharge unit can store an electric charge of the pulse signal and discharge the stored electric charge. The controller causes the charge-discharge unit to discharge the electric charge if the photo receiver receives the pulsed light, causes the charge-discharge unit to store the electric charge if the medium blocks the pulsed light and the photo receiver does not receive the pulsed light. The controller then starts supply of power to the CPU when the amount of the electric charge is at or above a threshold.

Insertion of the medium into the conveying path can be thereby detected without dependence on the CPU. Thus, the supply of power to the CPU can start after the insertion of the medium into the conveying path. Hence, the supply of power to the CPU that consumes large power can be suspended before the insertion of the medium into the conveying path and therefore the power consumption of the scanner can be reduced. In other words, the insertion of the medium into the conveying path can be detected with saved power.

The photo transmitter projects the pulsed light before the start of the supply of power to the CPU whereas being continuously lighted after the start of the supply of power to the CPU.

The power consumption before the start of the supply of power to the CPU can be further reduced thereby. The degree of freedom for determining a time point to detect the presence of the medium after the start of the supply of power to the CPU can be increased compared to that before the start of the supply of power to the CPU.

The technique according to the present disclosure can reduce power consumption.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading device comprising:
   a conveying path, a medium targeted for reading being conveyed in the conveying path;
   a central processing unit (CPU);
   a generator configured to generate a pulse signal;
   a sensor comprising a photo transmitter and a photo receiver, the photo transmitter configured to project pulsed light toward the conveying path in response to the pulse signal, the photo receiver facing the photo transmitter with the conveying path therebetween;
   a charge-discharge unit capable of storing an electric charge of the pulse signal and discharging the stored electric charge; and
   a controller configured to cause the charge-discharge unit to discharge the electric charge when the photo receiver receives the pulsed light, cause the charge-discharge unit to store the electric charge when the medium blocks the pulsed light and the photo receiver does not receive the pulsed light, and configured to start supply of power to the CPU when an amount of the electric charge stored in the charge-discharge unit is at or above a threshold.

2. The image reading device according to claim 1, wherein the photo transmitter projects the pulsed light before the supply of the power to the CPU starts and is continuously lighted after the supply of the power to the CPU starts.

3. An electronic device comprising:
   a central processing unit (CPU);
   a generator configured to generate a pulse signal;
   a sensor comprising a photo transmitter and a photo receiver, the photo transmitter configured to project pulsed light in response to the pulse signal, the photo receiver facing the photo transmitter;
   a charge-discharge unit capable of storing an electric charge of the pulse signal and discharging the stored electric charge; and
   a controller configured to cause the charge-discharge unit to discharge the electric charge when the photo receiver receives the pulsed light, cause the charge-discharge unit to store the electric charge when the photo receiver does not receive the pulsed light, and configured to start supply of power to the CPU when an amount of the electric charge stored in the charge-discharge unit is at or above a threshold.

4. A control method for an electronic device that includes:
   a central processing unit (CPU);
   a generator configured to generate a pulse signal;
   a sensor comprising a photo transmitter and a photo receiver, the photo transmitter configured to project pulsed light in response to the pulse signal, the photo receiver facing the photo transmitter; and
   a charge-discharge unit capable of storing an electric charge of the pulse signal and discharging the stored electric charge, the method comprising:
   discharging the electric charge from the charge-discharge unit when the photo receiver receives the pulsed light;
   storing the electric charge in the charge-discharge unit when the photo receiver does not receive the pulsed light; and
   starting supply of power to the CPU when an amount of the electric charge stored in the charge-discharge unit is at or above a threshold.

* * * * *